United States Patent
Liu et al.

(10) Patent No.: US 12,426,040 B2
(45) Date of Patent: Sep. 23, 2025

(54) DECODING CHANNEL STATE INFORMATION REPORT PART TWO

(71) Applicant: Telefonaktiebolaget LM Ericsson (PUBL), Stockholm (SE)

(72) Inventors: Qingchao Liu, Ottawa (CA); Xixian Chen, Ottawa (CA); Pierre Coll, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 353 days.

(21) Appl. No.: 18/249,798

(22) PCT Filed: Oct. 22, 2020

(86) PCT No.: PCT/IB2020/059934
§ 371 (c)(1),
(2) Date: Apr. 20, 2023

(87) PCT Pub. No.: WO2022/084723
PCT Pub. Date: Apr. 28, 2022

(65) Prior Publication Data
US 2023/0422241 A1    Dec. 28, 2023

(51) Int. Cl.
*H04W 72/1268* (2023.01)
*H04L 1/1867* (2023.01)
*H04W 72/21* (2023.01)

(52) U.S. Cl.
CPC ....... *H04W 72/1268* (2013.01); *H04L 1/1887* (2013.01); *H04W 72/21* (2023.01)

(58) Field of Classification Search
CPC .............. H04W 72/1268; H04W 72/21; H04L 1/1887; H04L 1/0038; H04L 1/0072; H04L 1/0026
See application file for complete search history.

(56) References Cited

U.S. PATENT DOCUMENTS

| | | | |
|---|---|---|---|
| 2018/0167932 A1* | 6/2018 | Papasakellariou | .... H04L 5/0091 |
| 2019/0149291 A1* | 5/2019 | Xiong | ................... H04L 5/0055 370/329 |

(Continued)

FOREIGN PATENT DOCUMENTS

WO    2020 200711 A1    10/2020

OTHER PUBLICATIONS

3GPP TS 38.211 V16.1.0 (Mar. 2020); 3rd Generation Partnership Project; Technical Specification Group Radio Access Network; NR; Physical channels and modulation (Release 16).

(Continued)

*Primary Examiner* — Liem H. Nguyen
(74) *Attorney, Agent, or Firm* — Sonoda & Kobayashi Intellectual Property Law; Sarvajit S. Patil

(57) ABSTRACT

According to some embodiments, a method performed by a network node for decoding a channel state information (CSI) report comprises generating a physical uplink shared channel (PUSCH) scrambling sequence, descrambling a PUSCH using the PUSCH scrambling sequence, decoding a CSI report part one to determine a rank indicator, and determining a location of a CSI report part two. The method further comprises extracting a scrambling sequence from the PUSCH scrambling sequence corresponding to the location of the CSI report part two, generating a CSI part two scrambling sequence based on the PUSCH scrambling sequence and the location of the CSI report part two, and applying the extracted scrambling sequence to the location of the CSI report part two. The method further comprises descrambling the location of the CSI report part two in the PUSCH using the CSI part two scrambling sequence and decoding the CSI part two.

12 Claims, 5 Drawing Sheets

(56) References Cited

U.S. PATENT DOCUMENTS

| | | | | |
|---|---|---|---|---|
| 2019/0166597 | A1* | 5/2019 | Xiong | H04L 1/1812 |
| 2019/0230688 | A1 | 7/2019 | Huang et al. | |
| 2020/0382256 | A1* | 12/2020 | Faxér | H04L 1/0026 |
| 2021/0175937 | A1* | 6/2021 | Yamada | H04W 16/28 |
| 2021/0367736 | A1* | 11/2021 | Manolakos | H04W 72/21 |
| 2022/0247459 | A1* | 8/2022 | Faxer | H04B 7/0626 |
| 2022/0271812 | A1* | 8/2022 | Matsumura | H04B 7/0478 |
| 2023/0097268 | A1* | 3/2023 | Rahman | H04W 72/0446 |
| | | | | 370/252 |

OTHER PUBLICATIONS

3GPP TS 38.214 V16.1.0 (Mar. 2020); 3rd Generation Partnership Project; Technical Specification Group Radio Access Network; NR; Physical layer procedures for data (Release 16).
3GPP TS 38.213 V16.1.0 (Mar. 2020); 3rd Generation Partnership Project; Technical Specification Group Radio Access Network; NR; Physical layer procedures for control (Release 16).
ETSI TS 138 212 v15.2.0 (Jul. 2018) 5G; NR; Multiplexing and channel coding (3GPP TS 38.212 version 15.2.0 Release 15).
3GPP TS 38.212 V16.1.0 (Mar. 2020); 3rd Generation Partnership Project; Technical Specification Group Radio Access Network; NR; Multiplexing and channel coding (Release 16).
Notification of Transmittal of the International Search Report and the Written Opinion of the International Searching Authority, or the Declaration issued for International application No. PCT/IB2020/059934—Jul. 21, 2021.

* cited by examiner

DECODING CHANNEL STATE INFORMATION REPORT PART TWO

PRIORITY

This nonprovisional application is a U.S. National Stage Filing under 35 U.S.C. § 371 of International Patent Application Serial No. PCT/IB2020/059934 filed Oct. 22, 2020 and entitled "DECODING CHANNEL STATE INFORMATION REPORT PART TWO" which is hereby incorporated by reference in its entirety.

TECHNICAL FIELD

Embodiments of the present disclosure are directed to wireless communications and, more particularly, to efficiently decoding one or two bits of channel state information (CSI) report part two in fifth generation (5G) new radio (NR).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In both long term evolution (LTE) and fifth generation (5G) standards, multiple-input multiple-output (MIMO) antenna technologies play an essential role in improving system capacity. MIMO not only enhances the conventional point-to-point link, but also enables new types of links, such as multiuser MIMO. A large family of MIMO techniques has been developed for various links and with various amounts of available channel state information in both LTE and 5G.

Channel state information (CSI) at the network side is indispensable to fully take advantage of the potential of such complex multiple antenna techniques. In LTE, a CSI reference signal (CSI-RS) is used by a UE to acquire channel state information, which is then reported to the eNB (network side). Similar to LTE, NR also uses CSI-RS for CSI acquisition, but NR defines a highly flexible but unified CSI framework that reduces the coupling between CSI measurement, CSI reporting, and the actual downlink transmission compared with LTE.

The CSI framework may be represented as a pool where different CSI report settings and CSI-RS resource settings for channel and interference measurement can be mixed and matched, so that they correspond to the antenna deployment and transmission scheme in use, and where CSI reports on different beams can be dynamically triggered.

For CSI-RS, each CSI resource setting contains one or several CSI resource sets, with each CSI resource set consisting of one or several CSI-RS resources. CSI-RS are defined in Third Generation Partnership Project (3GPP) Technical Specification (TS) 38.211 Clause 7.4.1.5.2 and 7.4.1.5.3 for sequence generation and physical resources mapping. A UE may be configured with one or more CSI resource settings for channel and interference measurement.

CSI report format, i.e. the frequency granularity of channel quality indicator (CQI) and precoding matrix indicator (PMI), is one of the major contents under CSI report configuration, which is signaled to the user equipment (UE) via radio resource control (RRC) reconfiguration message. It may be a combination of wideband/subband CQI and wideband/subband PMI. Furthermore, NR provides the ability to configure multiple CSI report configurations with different CSI report formats, while the downlink control information (DCI) for each scheduling assignment only triggers one configuration.

From downlink performance point of view, subband CQI/PMI provides better performance than wideband CQI/PMI. For uplink, the payload size of subband CSI in NR is a restricted factor from link budget perspective. Thus, it would be beneficial to have dynamic switch between wideband and subband. Subband report could be set as default for better downlink performance. If uplink coverage is limited, switching back to wideband is necessary.

When wideband PMI is configured, a UE will report wideband PMI index $i_1$ and wideband PMI index $i_2$. When subband PMI is configured, a UE will report wideband PMI index $i_1$ together with subband PMI index $i_2$.

The aperiodic CSI request is sent to the UE by an uplink physical uplink shared channel (PUSCH) scheduling grant with a special field indicating that A-CSI report is requested. Each CSI reporting includes two parts, CSI part 1 and CSI part 2.

CSI part 1 includes CSI resource indicator (CSI-RS), rank indicator (RI), wideband CQI, and subband CQI, if subband CQI is reported. CSI part 2 includes wideband PMI $i_{11}$, $i_{12}$, $i_{13}$, wideband PMI $i_2$, if wideband PMI is reported, and sub-band PMI $i_2$, if sub-band PMI is reported.

The CSI payload size of each part for wideband and sub-band reports for 32 ports are given in Table 1 and Table 2, respectively. For sub-band reporting, the payload size in the table is only given for each sub-band. The total size of payload depends on the channel bandwidth and sub-band size. For sub-band sizes and the number of sub-bands corresponding to each channel bandwidth, refer to Table 3.

TABLE 1

| CSI payload for wideband report, 32-ports | | | |
|---|---|---|---|
| Wideband reporting | | 32 ports | 32 ports |
| CSI report #1 | CSI fields | (N1, N2) - (8, 2) | (N1, N2) - (4, 4) |
| | | (O1, O2) - (4, 4) | (O1, O2) - (4, 4) |
| csiPayloadPart1 | CRI index | 0 | 0 |
| | Rank Indicator | 2 | 2 |
| | Wideband CQI | 4 | 4 |

TABLE 1-continued

| | | \multicolumn{8}{c}{CSI payload for wideband report, 32-ports} |
|---|---|---|---|---|---|---|---|---|---|
| | | Rank = 1 | Rank = 2 | Rank = 3 | Rank = 4 | Rank = 1 | Rank = 2 | Rank = 3 | Rank = 4 |
| csiPayloadPart2 | Wideband PMI: (i11, i12) + i13 | 5 + 3 + 0 | 5 + 3 + 2 | 4 + 3 +2 | 4 + 3 +2 | 4 + 4 + 0 | 4 + 4 + 2 | 3 + 4 + 2 | 3 + 4 + 2 |
| | Wideband PMI i2 | 2 | 1 | 1 | 1 | 2 | 1 | 1 | 1 |

TABLE 2

| | | \multicolumn{2}{c}{CSI payload for subband report, 32-ports} | |
|---|---|---|---|
| Subband reporting | | 32 ports | 32 ports |
| CSI report #1 | CSI fields | (N1, N2) - (8, 2) (O1, O2) - (4, 4) | (N1, N2) - (4, 4) (O1, O2) - (4, 4) |
| csiPayloadPart1 | CRI index | 0 | 0 |
| | Rank Indicator | 2 | 2 |
| | Wideband CQI | 4 | 4 |
| | Subband differential CQI for the first TB | 2 | 2 |

| | | Rank = 1 | Rank = 2 | Rank = 3 | Rank = 4 | Rank = 1 | Rank = 2 | Rank = 3 | Rank = 4 |
|---|---|---|---|---|---|---|---|---|---|
| csiPayloadPart2 | Wideband PMI: i11, i12) + i13 | 5 + 3 + 0 | 5 + 3 + 2 | 4 + 3 + 2 | 4 + 3 + 2 | 4 + 4 + 0 | 4 + 4 + 2 | 3 + 4 + 2 | 3 + 4 + 2 |
| | Subband PMI i2 - even subband | 2 | 1 | 1 | 1 | 2 | 1 | 1 | 1 |
| | Subband PMI i2 - odd subband | 2 | 1 | 1 | 1 | 2 | 1 | 1 | 1 |

TABLE 3

CSI subband size and number of subbands for subcarrier spacing (SCS) = 30 kHz (Ref to 38.214 Table 5.2.1.4-2)

| BWP size (MHz) | BWP size (PRBs) SCS = 30 kHz | Subband Size (PRBs) | #Subbands |
|---|---|---|---|
| 20 | 51 | 4, 8 | 13, 7 |
| 40 | 106 | 8, 16 | 14, 7 |
| 60 | 162 | 16, 32 | 11, 6 |
| 80 | 217 | 16, 32 | 14, 7 |
| 100 | 273 | 16, 32 | 18, 9 |

Uplink control information (UCI) is transmitted on PUSCH when an uplink PUSCH scheduling grant is received by the UE. It contains CSI report part 1 and 2 and downlink transmission hybrid automatic repeat request (HARQ) feedbacks.

For one codeword, CSI report part 1 contains the channel quality information, and CSI report part 2 contains the PMI index information. They are encoded independently.

For type 1 single-panel codebook (see 3GPP 38.214 Section 5.2.2.2.1), for 2 CSI-RS ports, the specification includes the following table for PMI index values.

| \multicolumn{2}{c}{RI = 1 (One layer)} | \multicolumn{2}{c}{RI = 2 (Two layers)} |
|---|---|---|---|
| PMI Index | PMI Matrix | PMI Index | PMI Matrix |
| 0 | $\frac{1}{\sqrt{2}}\begin{bmatrix}1\\1\end{bmatrix}$ | 0 | $\frac{1}{2}\begin{bmatrix}1 & 1\\1 & -1\end{bmatrix}$ |
| 1 | $\frac{1}{\sqrt{2}}\begin{bmatrix}1\\j\end{bmatrix}$ | 1 | $\frac{1}{2}\begin{bmatrix}1 & 1\\1 & -1\end{bmatrix}$ |
| 2 | $\frac{1}{\sqrt{2}}\begin{bmatrix}1\\-1\end{bmatrix}$ | | |
| 3 | $\frac{1}{\sqrt{2}}\begin{bmatrix}1\\-j\end{bmatrix}$ | | |

For channel coding for small block lengths, the specification includes the following UCI encoders depending on the number of its information bits.

| Number of information bits | Encoder |
|---|---|
| 1 | Table 5.3.3.1-1 of 38.212 |
| 2 | Table 5.3.3.2-1 of 38.212 |
| 3 to 11 bits | Section 5.3.3.3 R-M block encoder in 38 212 |
| >=12 bits | Section 5.3.1 Polar encoder in 38 212 |

The following is 1-bit encoder, where $N=Q_m$, $Q_m$ is the modulation order, and $c_0$ is one information bit. x and y ($x \neq y$) are placeholders to scramble the information bits in a way that maximizes the Euclidean distance of the modulation symbols carrying the information bits. In the product implementation, they can be represented by the arbitrarily chosen values which are not equal to either 0 or 1.

| $Q_m$ | Encoded bits $d_0, d_1, d_2, \ldots, d_{N-1}$ |
|---|---|
| 1 | $[c_0]$ |
| 2 | $[c_0\ y]$ |
| 4 | $[c_0\ y\ x\ x\ ]$ |
| 6 | $[c_0\ y\ x\ x\ x\ x]$ |
| 8 | $[c_0\ y\ x\ x\ x\ x\ x\ x]$ |

The following is 2-bit encoder, where $N=3Q_m$, $Q_m$ is the modulation order, and $[c_0\ c_1]$ are two information bits. $c_2=(c_0+c_1) \bmod 2$.

| $Q_m$ | Encoded bits $d_0, d_1, d_2, \ldots, d_{N-1}$ |
|---|---|
| 1 | $[c_0\ c_1\ c_2]$ |
| 2 | $[c_0\ c_1\ c_2\ c_0\ c_1\ c_2]$ |
| 4 | $[c_0\ c_1\ x\ x\ c_2\ c_0\ x\ x\ c_1\ c_2\ x\ x]$ |
| 6 | $[c_0\ c_1\ x\ x\ x\ x\ c_2\ c_0\ x\ x\ x\ x\ c_1\ c_2\ x\ x\ x\ x]$ |
| 8 | $[c_0\ c_1\ x\ x\ x\ x\ x\ x\ c_2\ c_0\ x\ x\ x\ x\ x\ x\ c_1\ c_2\ x\ x\ x\ x\ x\ x]$ |

Scrambling may be performed as follows. For the single codeword q=0, the block of bits $b^{(q)}(0), \ldots, b^{(q)}(M_{bit}^{(q)}-1)$, where $M_{bit}^{(q)}$ is the number of bits in codeword q transmitted on the physical channel, shall be scrambled prior to modulation, resulting in a block of scrambled bits $\tilde{b}^{(q)}(0), \ldots, \tilde{b}^{(q)}(M_{bit}^{(q)}-1)$ according to the following pseudo code

```
Set i = 0
while i < M_bit^(q)
    a       if b^(q)(i) = x// UCI placeholder bits
                b̃^(q)(i) = 1
    b       else
                if b^(q)(i) = y// UCI placeholder bits
                    a  b̃^(q)(i) = b̃^(q)(i - 1)
                else
                    b  b̃^(q)(i)=(b^(q)(i)+c^(q)(i))mod2
                end if
    c       end if
    d       i = i + 1
end while
```

The scrambling sequence $c^{(q)}(i)$ is given by Section 5.2.1 of 38.211. The scrambling sequence generator is initialized with $c_{init}=n_{RNTI}\cdot 2^{15}=n_{ID}$.

There currently exist certain challenges. An example is illustrated in FIG. 1.

FIG. 1 is a flow diagram illustrating dependency and chaining of functional blocks for UCI and PUSCH data decoding. At PUSCH allocation time (about 1 slot earlier than the airlink time), the soft bit locations for downlink HARQ soft bits and CSI report part 1 soft bits are calculated and the scrambling sequence is generated.

Downlink HARQ 1 or 2 bits are reserved and puncture CSI part 2 soft bits or data soft bits according to 3GPP NR specifications; but CSI part 2 scrambling bits cannot be corrected based on x and y location because the number of soft values and their location are unknown until after CSI part 1 decoding.

CSI report part 2 and data soft locations are not known at this time. The process must wait until CSI part 1 has been demultiplexed and decoded to find the correct rank indicator. CSI part 2 and data are conditioned on the decoded rank indicator. The process cannot prepare for the x and y location treatment of the scrambling sequence at allocation time as for downlink 1 or 2 bit HARQ.

One possible solution is to duplicate the UCI and PUSCH data decoding chain from Step 1 to Step 3 (the function blocks enclosed by the dashed lines) as shown in FIG. 1. One is for rank 1, and the other is for rank 2. Because this method consumes a significant amount of CPU cycles and memories, it is not a preferred solution.

SUMMARY

Based on the description above, certain challenges currently exist with efficiently decoding one or two bits of channel state information (CSI) report part two in fifth generation (5G) new radio (NR). Certain aspects of the present disclosure and their embodiments may provide solutions to these or other challenges. For example, particular embodiments efficiently decode 1 or 2 bits CSI part 2 with two CSI RS ports. Because at the beginning of the decoding process, the exact locations of CSI report part 2 soft bits is unknown, particular embodiments treat them as the normal data soft bits when generating the descrambling sequence and perform the descrambling process for all the input soft bits which may include both UCI and data soft bits. The UCI may contain downlink HARQ feedbacks plus CSI report part 1 and 2.

After CSI part 1 is decoded, the rank information is known, and particular embodiments are able to locate the positions of CSI report part 2 bits. Based on the known soft value locations for CSI part 2, particular embodiments extract the scrambling sequence from the total scrambling sequence. Particular embodiments apply the extracted CSI part 2 scrambling sequence to the extracted CSI part 2 soft values. This is equivalent to undoing what was done before for the CSI part 2 soft values.

In the next step, particular embodiments reproduce the correct CSI part 2 scrambling sequence and apply it to the extracted CSI part 2 soft values. After rate de-matching, the 1 or 2 bits of CSI report part 2 can be decoded.

According to some embodiments, a method performed by a network node for decoding a CSI report comprises generating a PUSCH scrambling sequence for descrambling a PUSCH without accounting for the existence of a CSI report part two and receiving the PUSCH from a wireless device. The PUSCH comprises a CSI report part one and a CSI report part two. The method further comprises descrambling the PUSCH using the PUSCH scrambling sequence, decoding the CSI report part one from the descrambled PUSCH to determine a rank indicator, and determining a location of CSI report part two soft bits in the PUSCH based on the rank indicator. The method further comprises extracting a scrambling sequence from the PUSCH scrambling sequence corresponding to the location of the CSI report part two in the PUSCH, generating a CSI part two scrambling sequence based on the PUSCH scrambling sequence and the location of the CSI report part two in the PUSCH with correct x and y locations, and applying the extracted scrambling sequence to the location of the CSI report part two soft bits in the PUSCH to undo the incorrect scrambling. The method further comprises descrambling the location of the CSI report part two soft bits in the PUSCH using the CSI part two scrambling sequence and decoding the CSI report part two.

In particular embodiments, the decoding of the CSI part two is performed without delaying the decoding of CSI part one or hybrid automatic repeat request (HARQ) feedback.

In particular embodiments, the CSI report part two is either one bit or two bits.

In particular embodiments, the PUSCH further comprises 1 or 2 bits hybrid automatic repeat request (HARQ) feedback and the PUSCH scrambling sequence accounts for the 1 or 2 bits HARQ feedback. The PUSCH may further comprise data.

According to some embodiments, a network node is capable of decoding a CSI report. The network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments decode CSI part two without impacting total latency and memory. Particular embodiments decode CSI part two without impacting latency for downlink HARQ and CSI part one decoding latency, which are critical.

More specifically, particular embodiments break the inter-dependencies between the function blocks illustrated in FIG. 1 and localize the impact to CSI part two decoding. Particular embodiments save about 1 slot processing time and CM and EM buffers for uplink HARQ and data decoding. Some embodiments save 1 slot processing time for CSI part one decoding and save 1 slot processing time for downlink HARQ feedback decoding.

Particular embodiments do not significantly impact the CSI part two decoding because the number of CSI part two soft bits is small for 1 or 2 CSI part two information bits, usually just for a few resource elements (REs) depending on modulation order. The higher the order, the fewer the number of REs.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, certain challenges currently with efficiently decoding one or two bits of channel state information (CSI) report part two in fifth generation (5G) new radio (NR). For example, duplicating the uplink control information (UCI) and physical uplink shared channel (PUSCH) data decoding chain (illustrated in FIG. 1) for rank 1 and for rank 2 is inefficient and time consuming.

Certain aspects of the present disclosure and their embodiments may provide solutions to these or other challenges. For example, particular embodiments locate the positions of CSI report part two soft bits and based on their positions, extract the scrambling sequence from the total scrambling sequence. The extracted CSI part two scrambling sequence is applied to the extracted CSI part two soft values to reproduce the correct CSI part two scrambling sequence and apply it to the extracted CSI part two soft values.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
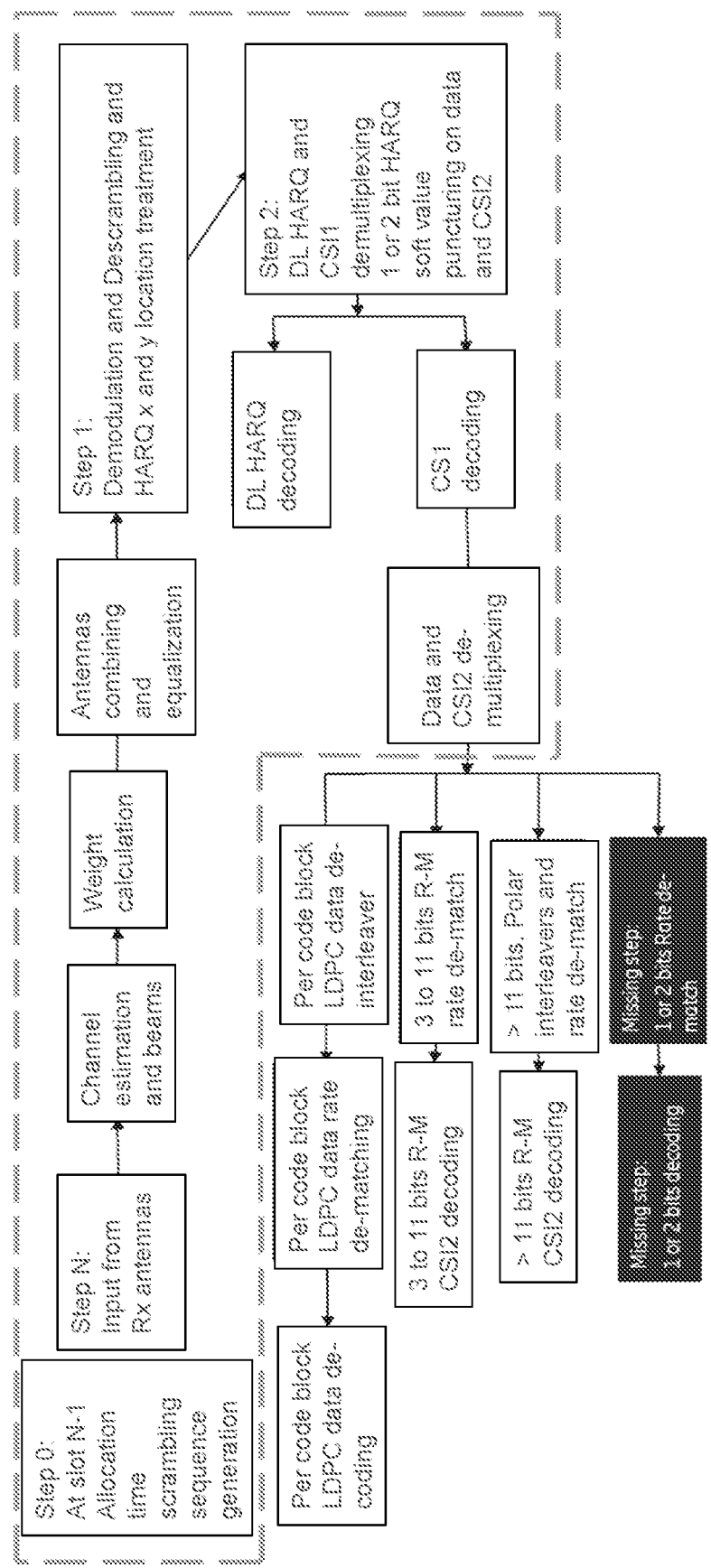
FIG. 1 is a flow diagram illustrating dependency and chaining of functional blocks for uplink control information (UCI) and physical uplink shared channel (PUSCH) data decoding.

To avoid duplicating the processing chains from Step 1 to Step 3 shown in FIG. 1, particular embodiments recover the original CSI part two soft values and apply the punctured scrambling sequence after Step 3. An example is illustrated in FIG. 2.

Figure 2:
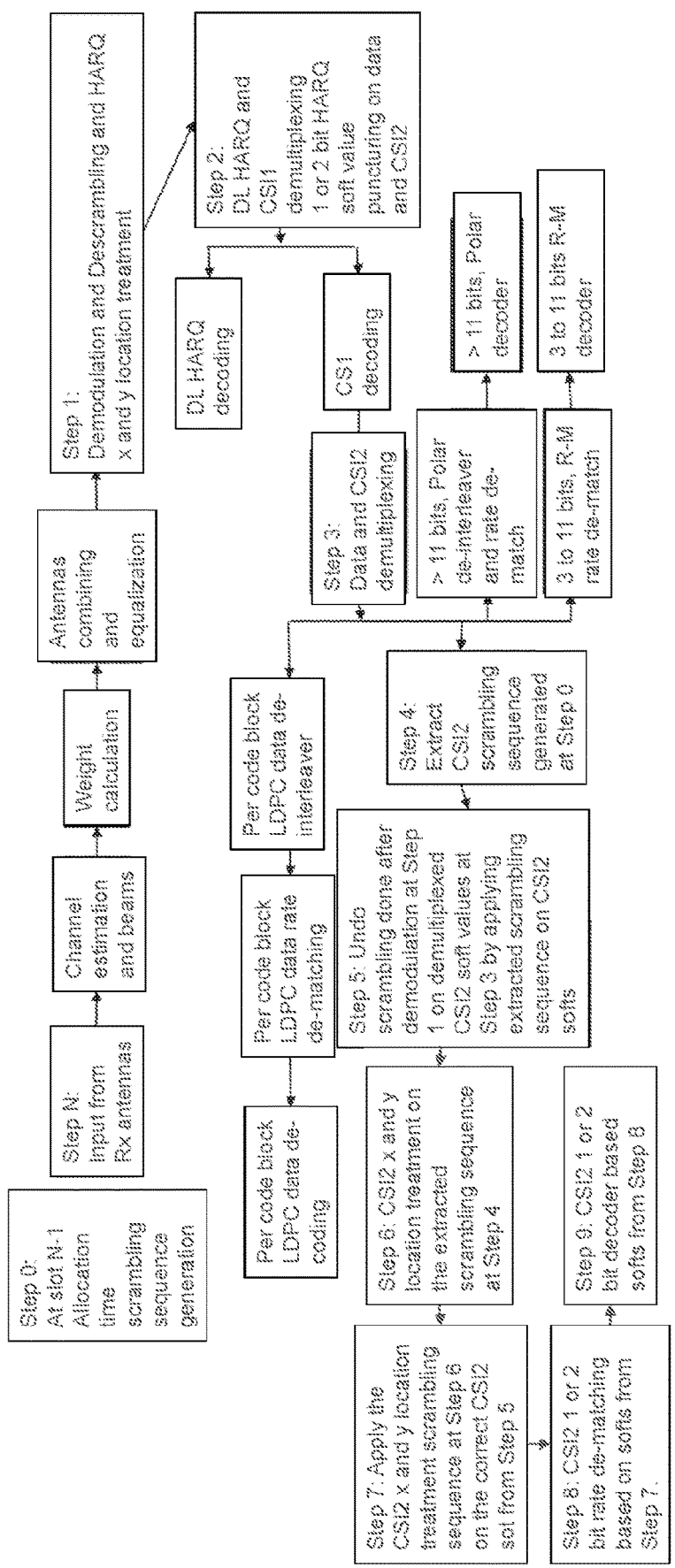
FIG. 2 is a flow diagram illustrating functional blocks for effectively decoding 1 or 2 bits CSI report part two, according to a particular embodiment.

FIG. 2 is a flow diagram illustrating functional blocks for effectively decoding 1 or 2 bits CSI report part two, according to a particular embodiment. At step 0, at PUSCH allocation time (about 1 slot earlier than the airlink slot), the PUSCH scrambling sequence is generated and special treatment for x and y locations is also done if the PUSCH has 1 or 2 bits downlink HARQ. The x and y location treatment for CSI part two cannot be performed because the number of CSI part 2 soft values is not yet known. The information is known only after CSI report part one decoding to get the rank information.

At step 1, at demodulation time, parallel threads may be launched to produce chunks of soft values, and they are in digital signal processor (DSP) local data memory (LDM) cache. The descrambling is performed based on the sequence generated at step 0, x and y location treatment for downlink HARQ 1 or 2 bit is taken care of. The CSI part 2 x and y location treatment cannot be performed when generating the descrambling sequence because the rank information is not available in this step. Otherwise, some solutions would have to do several copies of demodulation soft values to cover all rank possibilities, which is difficult due to memory, CPU cycles, and latency limitations.

At step 2, demultiplexing CSI part one and downlink HARQ results in CSI part one and downlink HARQ soft values and the leftover soft values for CSI part two and data. The 1 or 2 bits HARQ soft values puncturing on CSI part two and data soft values are done at the end of this step.

At step 3, after CSI part one decoding, the rank information is known and thus particular embodiments perform rate de-matching for CSI part two and data. The number of CSI part two soft values and how many data soft values is known and particular embodiments perform demultiplexing to know their specific locations in the total soft values for PUSCH.

At step 4, based on the known soft value locations from step 3 for CSI part two, particular embodiments extract the scrambling sequence from the total scrambling sequence.

At step 5, particular embodiments apply the extracted CSI part two scrambling sequence from step 4 to the extracted CSI part two soft values from step 3. This is equivalent to undo what was done in step 1 for the CSI part two soft values, because it is not correct for those particular soft values. The soft values for CSI part two are recovered to their original values.

At step 6, The CSI part 2 x and y locations are known from step 3 and particular embodiments apply the x and y location treatment based on the extracted CSI part two scrambling sequence from step 4 to produce the correct CSI part two scrambling sequence.

At step 7, particular embodiments apply the CSI part two correct scrambling sequence from step 6 to the recovered original CSI part two soft values from step 5 to produce the correct de-scrambled CSI part two soft values.

At step 8, particular embodiments use the correctly scrambled CSI part two soft values from step 7 and perform rate de-matching.

At step 9, the rate matched soft values are used for 1 or 2 bits decoding and produce 1 or 2 bits decoded values.

Figure 3:
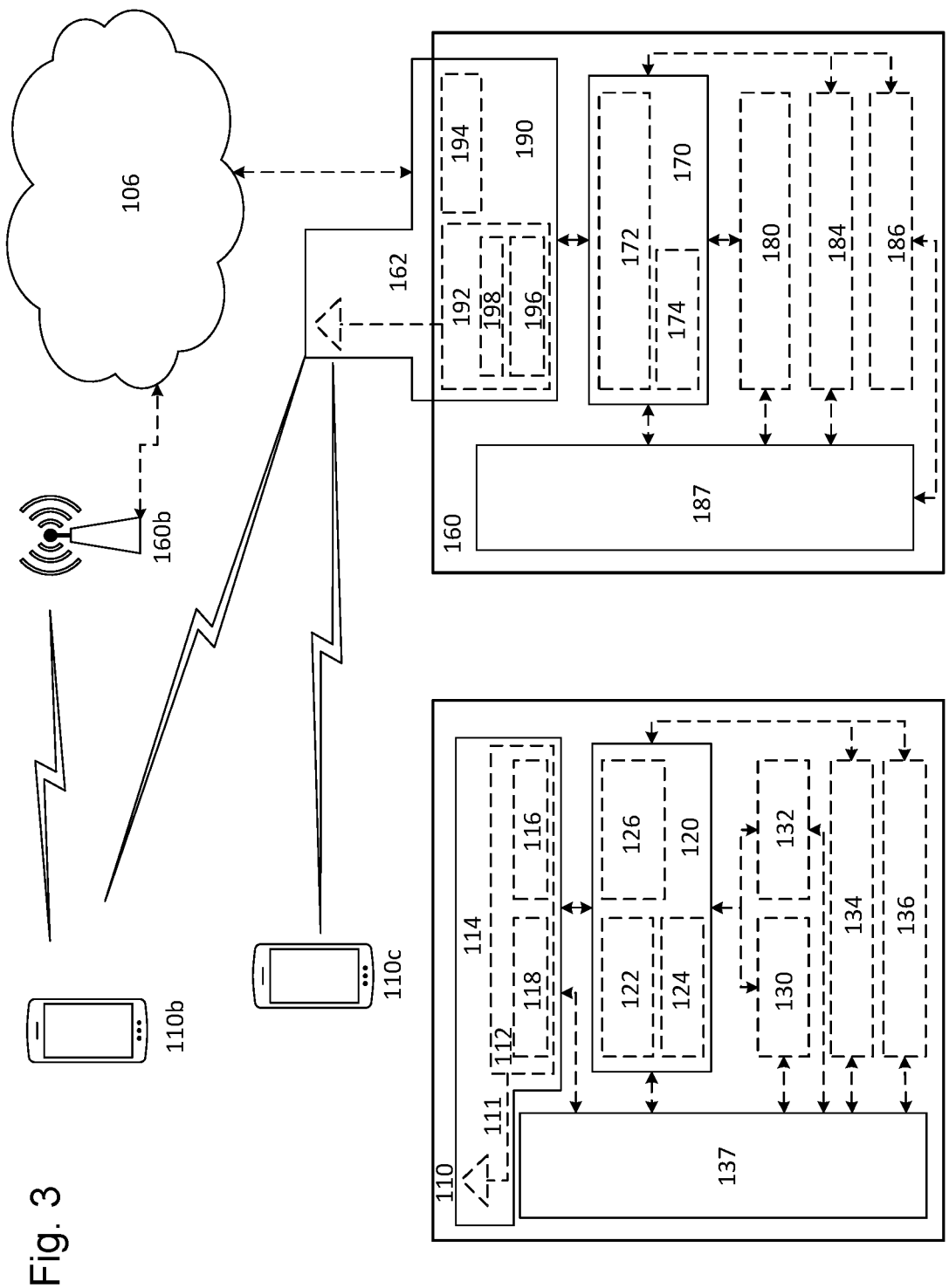
FIG. 3 is a block diagram illustrating an example wireless network.

FIG. 3 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 4:
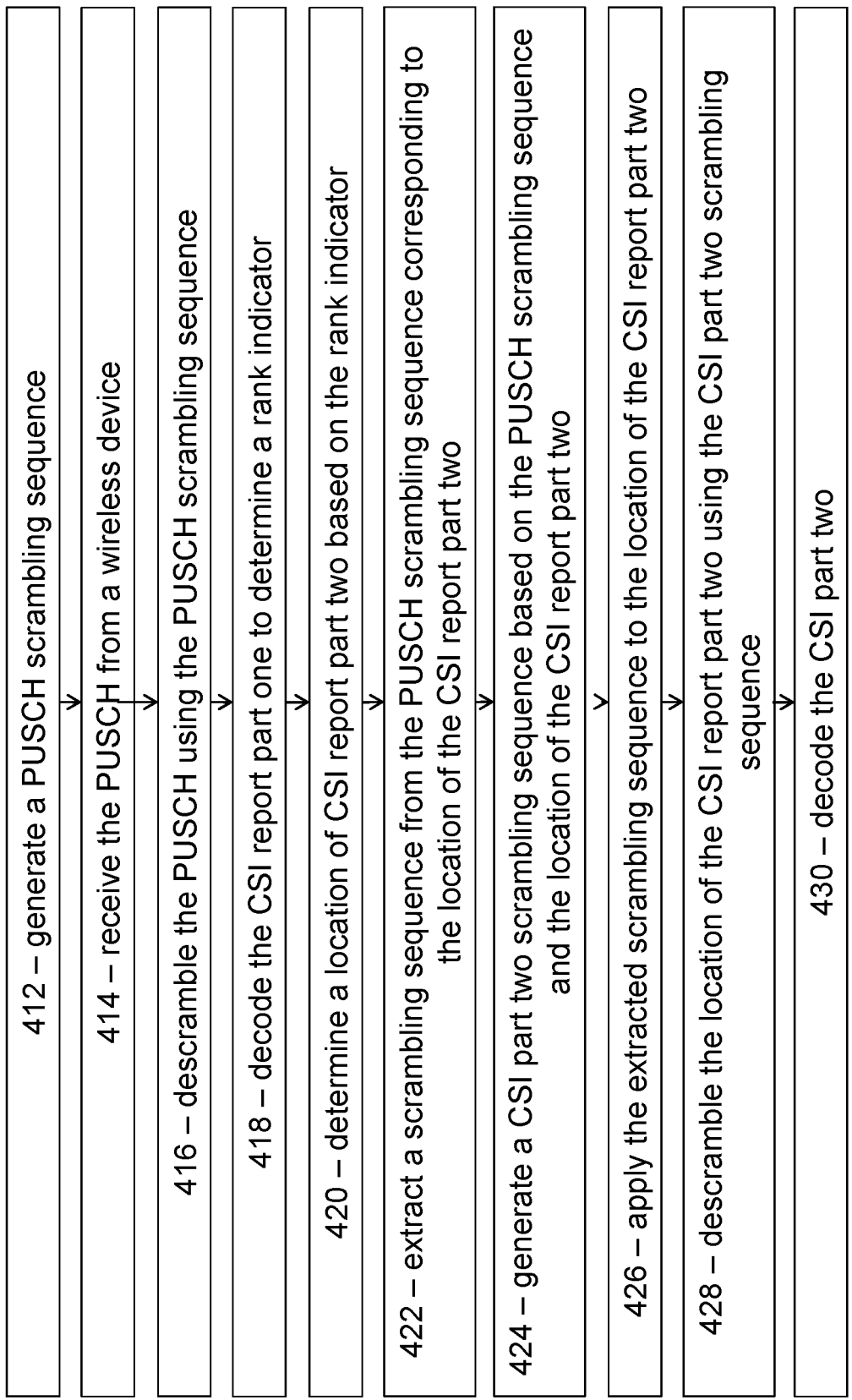
FIG. 4 is flowchart illustrating an example method in a network node, according to certain embodiments.

FIG. 4 is a flowchart illustrating an example method in a network node, according to certain embodiments. In particular embodiments, one or more steps of FIG. 4 may be performed by network node 160 described with respect to FIG. 3. The network node is operable to decode a CSI report in a PUSCH.

The method begins at step 412, where the network node (e.g., network node 160) generates a PUSCH scrambling sequence for descrambling a PUSCH without accounting for the existence of a CSI report part two. For example, network node 160 may generate a PUSCH scrambling sequence as described with respect to step 0 of FIG. 2. The PUSCH may account for one or two bits HARQ indications and CSI part one, but not a 1 or 2 bit CSI part two.

At step 414, the network node receives the PUSCH from a wireless device. The PUSCH comprises a CSI report part one and a CSI report part two. For example, network node 160 may receive a PUSCH from wireless device 110. The PUSCH may additionally include HARQ indications and data.

At step 416, the network node descrambles the PUSCH using the PUSCH scrambling sequence from step 414. For example, network node 160 may descramble the PUSCH as described with respect to step 1 of FIG. 2.

At step 418, the network node decodes the CSI report part one from the descrambled PUSCH to determine a rank indicator. At step 420, the network node determines a location of CSI report part two soft bits in the PUSCH based on the rank indicator. Examples are described with respect to steps 2 and 3 of FIG. 2.

Now that the rank indicator is known, at step 422 the network node extracts a scrambling sequence from the PUSCH scrambling sequence corresponding to the location of the CSI report part two in the PUSCH. For example, network node 160 may extract the scrambling sequence as described with respect to step 4 of FIG. 2.

At step 424, the network node generates a CSI part two scrambling sequence based on the PUSCH scrambling sequence and the location of the CSI report part two in the PUSCH with correct x and y locations. For example, network node 160 may generate the CSI part two scrambling sequence as described with respect to step 6 of FIG. 2.

At step 426, the network node applies the extracted scrambling sequence to the location of the CSI report part two soft bits in the PUSCH to undo the incorrect scrambling. For example, network node 160 may apply the extracted scrambling sequence as described with respect to step 5 of FIG. 2.

At step 428, the network node descrambles the location of the CSI report part two soft bits in the PUSCH using the CSI part two scrambling sequence. The CSI part two scrambling sequence is now the correct scrambling sequence that accounts for CSI report part two and the network node is able to descramble the CSI part two correctly. For example, network node 160 may descramble the CSI report part two as described with respect to step 7 of FIG. 2.

At step 430, the network node decodes the CSI part two. For example, the network node may decode the CSI part two as described with respect to steps 8 and 9 of FIG. 2.

Modifications, additions, or omissions may be made to method 400 of FIG. 4. Additionally, one or more steps in the method of FIG. 4 may be performed in parallel or in any suitable order.

Figure 5:
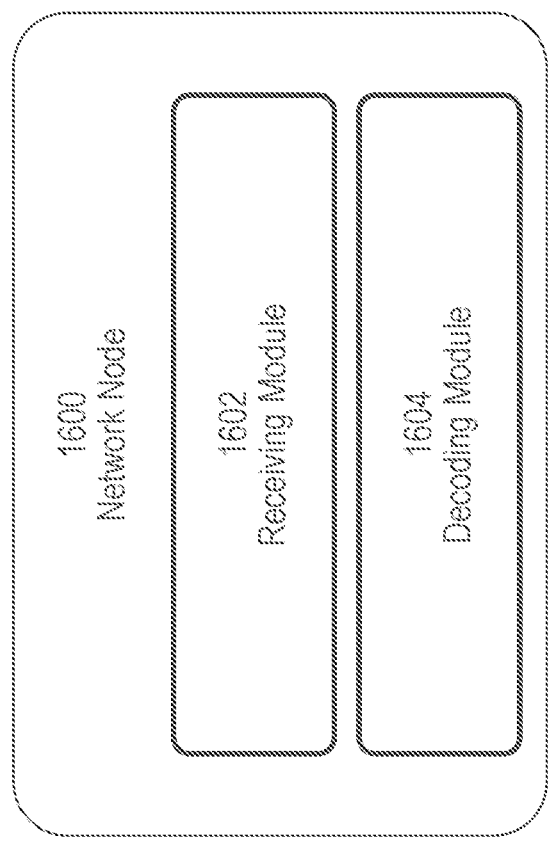
FIG. 5 illustrates a schematic block diagram of a network node in a wireless network, according to certain embodiments.

FIG. 5 illustrates a schematic block diagram of an apparatus in a wireless network (for example, the wireless network illustrated in FIG. 3). The apparatus may comprise a network node (e.g., network node 160 in FIG. 3). Apparatus 1600 is operable to carry out the example method described with reference to FIG. 4. Apparatus 1600 may be operable to carry out other processes or methods disclosed herein. It is also to be understood that the method of FIG. 4 is not necessarily carried out solely by apparatus 1600. At least some operations of the method can be performed by one or more other entities.

Virtual apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, decoding module 1604, and any other suitable units of apparatus 1600 to perform corresponding functions according one or more embodiments of the present disclosure.

As illustrated in FIG. 5, apparatus 1600 includes receiving module 1602 configured to receive a PUSCH according to any of the embodiments and examples described herein. Decoding module 1604 is configured to decode the PUSCH, according to any of the embodiments and examples described herein, such as described with respect to FIGS. 2 and 4.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a network node for decoding a channel state information (CSI) report, the method comprising:
   generating a physical uplink shared channel (PUSCH) scrambling sequence for descrambling a PUSCH without accounting for the existence of a CSI report part two;
   receiving the PUSCH from a wireless device, the PUSCH comprising a CSI report part one and a CSI report part two, wherein the CSI report part one and CSI report part two are encoded independently;
   descrambling the PUSCH using the PUSCH scrambling sequence;
   decoding the CSI report part one from the descrambled PUSCH to determine a rank indicator;
   determining a location of CSI report part two soft bits in the PUSCH based on the rank indicator;
   extracting a scrambling sequence from the PUSCH scrambling sequence corresponding to the location of the CSI report part two in the PUSCH;
   generating a CSI part two scrambling sequence based on the PUSCH scrambling sequence and the location of the CSI report part two in the PUSCH with correct x and y locations;
   applying the extracted scrambling sequence to the location of the CSI report part two soft bits in the PUSCH to undo the incorrect scrambling;
   descrambling the location of the CSI report part two soft bits in the PUSCH using the CSI part two scrambling sequence; and
   decoding the CSI part two.

2. The method of claim 1, wherein the decoding of the CSI part two is performed without delaying the decoding of CSI part one or hybrid automatic repeat request (HARQ) feedback.

3. The method of claim 1, wherein the CSI report part two is one bit.

4. The method of claim 1, wherein the CSI report part two is two bits.

5. The method of claim 1, wherein the PUSCH further comprises 1 or 2 bits hybrid automatic repeat request (HARQ) feedback and the PUSCH scrambling sequence accounts for the 1 or 2 bits HARQ feedback.

6. The method of claim 1, wherein the PUSCH further comprises data.

7. A network node capable of decoding a channel state information (CSI) report, the network comprising processing circuitry operable to:
   generate a physical uplink shared channel (PUSCH) scrambling sequence for descrambling a PUSCH without accounting for the existence of a CSI report part two;
   receive the PUSCH from a wireless device, the PUSCH comprising a CSI report part one and a CSI report part two, wherein the CSI report part one and CSI report part two are encoded independently;
   descramble the PUSCH using the PUSCH scrambling sequence;
   decode the CSI report part one from the descrambled PUSCH to determine a rank indicator;
   determine a location of CSI report part two soft bits in the PUSCH based on the rank indicator;
   extract a scrambling sequence from the PUSCH scrambling sequence corresponding to the location of the CSI report part two in the PUSCH;
   generate a CSI part two scrambling sequence based on the PUSCH scrambling sequence and the location of the CSI report part two in the PUSCH with correct x and y locations;
   apply the extracted scrambling sequence to the location of the CSI report part two soft bits in the PUSCH to undo the incorrect scrambling;
   descramble the location of the CSI report part two soft bits in the PUSCH using the CSI part two scrambling sequence; and
   decode the CSI part two.

8. The network node of claim 7, wherein the decoding of the CSI part two is performed without delaying the decoding of CSI part one or hybrid automatic repeat request (HARQ) feedback.

9. The network node of claim 7, wherein the CSI report part two is one bit.

10. The network node of claim 7, wherein the CSI report part two is two bits.

11. The network node of claim 7, wherein the PUSCH further comprises 1 or 2 bits hybrid automatic repeat request (HARQ) feedback and the PUSCH scrambling sequence accounts for the 1 or 2 bits HARQ feedback.

12. The network node of claim 7. wherein the PUSCH further comprises data.

* * * * *